United States Patent [19]
Tucker

[11] 3,805,566
[45] Apr. 23, 1974

[54] VACUUM OPERATED LOCKING DEVICE
[76] Inventor: Irwin Tucker, 2662 West St., Brooklyn, N.Y. 11223
[22] Filed: Nov. 13, 1972
[21] Appl. No.: 305,942

[52] U.S. Cl.................... 70/241, 70/275, 292/201
[51] Int. Cl........................ E05b 65/19, E05b 51/02
[58] Field of Search ............ 70/240, 241, 255, 263, 70/264, 275; 292/144, 201

[56] References Cited
UNITED STATES PATENTS
| | | | |
|---|---|---|---|
| 3,135,541 | 6/1964 | Kwasek | 292/64 |
| 3,019,848 | 2/1962 | Garvey et al. | 180/82 |
| 3,113,447 | 12/1963 | Oishei | 70/262 |
| 1,296,735 | 3/1919 | Arbuckle | 188/154 |
| 3,199,153 | 8/1965 | Weinstein | 49/379 |
| 3,596,484 | 8/1971 | Peters | 70/240 |

Primary Examiner—Albert G. Craig, Jr.
Attorney, Agent, or Firm—Kenneth S. Goldfarb

[57] ABSTRACT

A locking mechanism for the hood of a car that depends on a vacuum from the car's intake manifold and includes a vacuum diaphragm connected to a locking latch by a linkage, a vacuum switch connected between a first vacuum hose which connects to vacuum diaphragm and a second vacuum hose which connects to the intake manifold.

4 Claims, 4 Drawing Figures

PATENTED APR 23 1974 3,805,566

VACUUM OPERATED LOCKING DEVICE

BACKGROUND OF THE INVENTION

1. Field of the Invention

This invention provides a locking mechanism. More specifically, this invention provides a locking mechanism that secures the hood of an automobile and operates from a vacuum intake manifold of the automobile.

2. Description of the Prior Art

Conventional methods for fastening the hood of an automobile or the like, consist generally of a single lock or pin latch under the hood. Obtaining access to the engine merely entails manually releasing the pin or locking latch situated under the automobile hood. Some conventional methods additionally include a safety latch for further secring the hood. These conventional methods which install a safety latch in the interior of the vehicle in addition to the pin latch, did succeed in securing the hood to a sufficient extent so as to avert accidental release of the hood's pin latch, especially during motion of the automobile. However, with the increase of auto theft and vandalism, a need arose for a means whereby the safety latch could be released from the interior of the automobile by a pull latch. This would curtail easy access to the engine and the engine parts. This interior release pull latch is now a standard feature in the majority of automobiles manufactured today.

The nature of this interior release pull latch is such that the hood of an automobile may be disengaged only from the inside of the car. The success of the interior release pull latch in curtailing auto theft and vandalism has been minimal. Therefore, it is apparent that even through this conventional precautionary method of an interior release pull latch, the theft of an automobile is still a simple process. By breaking and entering of an automobile without doing any noticeable damage thereto the thief would merely pull the interior release pull latch to obtain access to the engine. The engine could thereafter be started by initially connecting a conductor from the positive side of the battery to the battery side of the solenoid and subsequently "jumping" the solenoid coil by conductive means (e.g., such as a screw driver).

A highly desirable necessity of present-day automobiles is to incorporate a locking mechanism designed to eliminate the aforementioned deficiencies of the conventional hood pin latch, hood safety latch, and interior release pull latch.

SUMMARY OF THE INVENTION

The present invention accomplishes its desired objects by utilizing a locking means, means for fastening and retracting the locking means, and a vacuum means regulated by a vacuum switch. A vacuum switch controls a vacuum to the means for fastening and retracting the locking means.

Further, the present innovation accomplishes its desired objects through the simplicity of operating from the automobile engine, and also utilizing already existing parts.

Still other objects of the invention are to provide a relatively inexpensive method of manufacture. The invention can be incorporated with the conventional pull and pin latches and can be installed after the purchase of the car.

These together with the various ancillary objects and features which will become apparent to those artisans possessing ordinary skill in the art and as the following description proceeds, are attained by this novel vacuum operated locking mechanism, a preferred embodiment shown in the accompanying drawings, by way of example only.

DESCRIPTION OF THE PREFERRED EMBODIMENT

This invetnion provides a locking mechanism for the hood of an automobile, or the like, that depends on a vacuum. The locking means employed may be any suitable means whereby a car's hood may be fastened. In a preferred embodiment, the locking means is a locking latch pivotally connected to any member whereby the latch may be retracted or fastened with facility. The locking latch is directly connected to means for fastening and retracting which can be any means that utilizes pressure regulation to retract or fasten. In a preferred embodiment, the means for fastening and retracting comprises a vacuum diaphragm having a spring connected by a steel linkage, or the like, to the locking latch.

Figure 1:
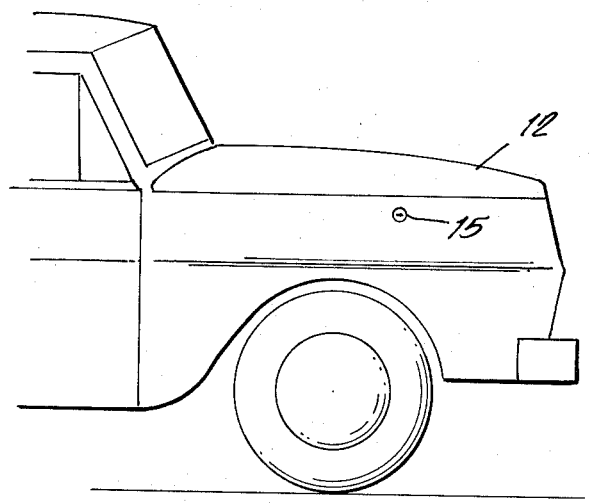
FIG. 1 is an elevational view of a portion of a vehicle showing installation of the invention.
Figure 2:
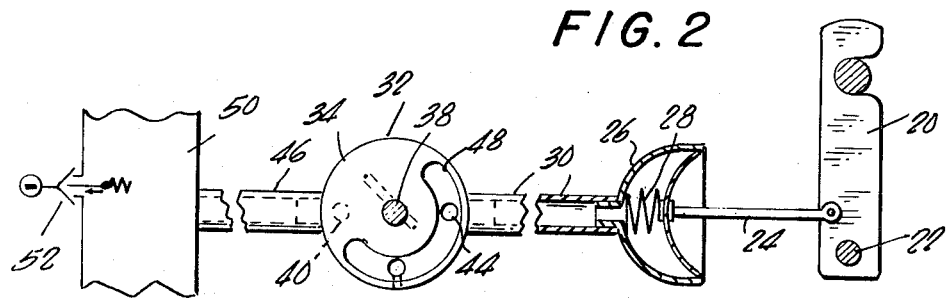
FIG. 2 is a schematic illustration of a preferred embodiment of the vacuum locking mechanism.
Figure 3:
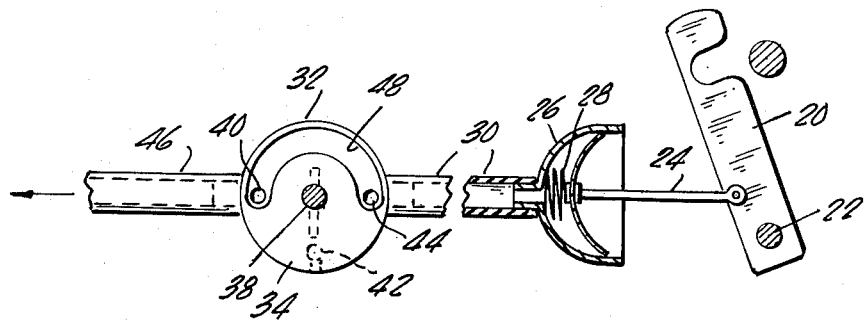
FIG. 3 is a schematic view similar to FIG. 2 illustrating the top member of the vacuum switch in a different position from that shown in FIG. 2.
Figure 4:
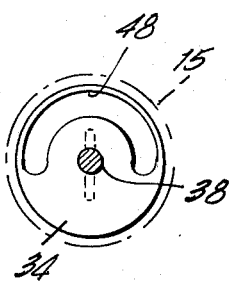
FIG. 4 is a schematic view of another position of the vacuum switch from that shown in FIG. 2.

As illustrated in the drawings, wherein like reference numerals designate identical parts in the four views, and in particular FIG. 2 there is seen locking latch 20 pivotally connected at 22 and connected by a link 24, to vacuum diaphragm 26 which may have a spring 28. Vacuum switch 32 controls the vacuum (or pressure) to diaphragm 26 through vacuum hose 30. Vacuum hose 46 also connects to switch 32 and serves as means for conducting a vacuum from an intake manifold.

The vacuum switch 32 controls a vacuum to the vacuum diaphragm 26. The cavuum switch 32 may be key operated and is controlled through a key operated lock 15 on the hood 12 of a vehicle and is situated between the two vacuum hoses 30 and 46 wherein one hose 30 connects to the pressure diaphragm 26 and the other hose 46 leads to an intake manifold of an automobile, or any other suitable vacuum means. It is preferred that the vacuum switch 32 be located on the hood or fender of the car but may also be installed inside the vehicle and contain two superimposed circular members 34 and 36 with a common pivot point 38 wherein the bottom member 36 has at least three air or gas ports 40, 42, and 44 whose opening and closing are manually accomplished by notation of the top circular member 34 having a semicircular selector channel 48 of desired constant width less than the radius of the top circular member 34, hand located between the pivot point 38 and the top circular member's periphery. Of course the device may be used on trucks, bus and other vehicles as well as automobiles. The three gas ports 40, 42, and 44 should be situated such that they are connected to vacuum means by their openings being in series with the vacuum hoses 30 and 46. When the selector channel 48 covers a particular combination of two gas ports, 40 and 44 the locking latch is retracted; when the selector channel 48 covers the combination of two gas ports 42 and 44, the locking 20 is fastened. When the latch 20 is retracted, the system contains a vacuum (less than atmospheric pressure). When the system contains no vacuum, but atmospheric pressure, the latch is fastened and a breaking and entering of the hood of a car would destroy the vacuum diaphragm, switch or vacuum hose. This would not only be indicative that the vehicle was probably stolen and require an expensive repair bill, but would impair the operation of the car engine and would substantially prevent theft of the automobile due to a "bucking" effect in the running engine caused by too much oxygen (air) in the combustion chambers of the engine.

An Electric cut off switch may be used in conjunction with vacuum diaphragm 28 so that when hood is locked the wire (hot) between the coil end distrubtor is grounded rendering the ignition system unworkable. There is provided a high pressure vacuum container 50 having a back pressure valve and located between the intake manifold of the automobile and the vacuum switch 32. This is highly desirable, since no vacuum exists when the automobile's engine is not running. Without this high pressure vacuum container the hood would have to be raised only while the engine is operating, and subsequently secured after raising the hood in order, for example, to check the engine's oil. A high pressure vacuum container having a manually operable vent valve 52 would allow the raising of the hood after securing the engine because a vacuum would still remain in the system.

This valve 52 would close with the key in the ignition but would open releasing the vacuum when the ignition key is removed.

A latitude of modification, change and substitution is intended in the foregoing disclosure, and in some instances some features of the invention will be employed with out a corresponding use of other features.

What is claimed is:

1. A locking mechanism comprising a latch, means for projecting and retracting said latch, said means including vacuum means which includes a vacuum source and a conduit interconnecting said vacuum source and said means for projecting and retracting said latch, a switch in said conduit for selectively closing and opening said conduit, a vent in said conduit biased to open position and a removable element maintaining said vent closed when inserted and permitting opening of said vent when removed.

2. The locking mechanism of claim 1 wherein said removable element comprises an ignition key of an automobile.

3. The locking mechanism of claim 1, wherein said vacuum switch comprises a first circular member and a second circular member arranged in superimposed position relative to each other and said circular members having a common pivot point, said first circular member being situated above said second member and includes a semi-circular selector channel situated between said common pivot point and the periphery of said first circular member, said second circular member having at least three gas ports wherein two of said three gas ports are connected to said vacuum means.

4. The locking mechanism of claim 1, said means for projecting and retracting said latch comprising a vacuum diaphragm including a spring, said vacuum diaphragm being connected by a linkage to said latch, said vacuum means including a first vacuum hose for connection to an intake manifold of an automobile and to said vacuum switch, said vacuum switch being additionally connected to said vacuum diaphragm by a second vacuum hose, said vacuum means additionally including a high pressure vacuum container having a vent valve and situated between said intake manifold of an automobile and said vacuum switch.

* * * * *